United States Patent [19]
Mizuno
[11] 4,337,468
[45] Jun. 29, 1982

[54] METHOD AND DEVICE FOR CONTROLLING CONCENTRATION OF INK FOR INK-JET PRINTER

[75] Inventor: Akinori Mizuno, Yokohama, Japan
[73] Assignee: Ricoh Co., Ltd., Tokyo, Japan

[21] Appl. No.: 204,741
[22] Filed: Nov. 7, 1980
[30] Foreign Application Priority Data
Nov. 16, 1979 [JP] Japan ................................ 54/147709
[51] Int. Cl.$^3$ ............................................. G01D 15/18
[52] U.S. Cl. ....................................... 346/1.1; 346/75; 346/140 R
[58] Field of Search ................. 346/75, 140 R, 140 IJ, 346/140 PD, 1.1; 137/392, 389, 386, 92

[56] References Cited
U.S. PATENT DOCUMENTS

| | | | |
|---|---|---|---|
| 3,835,881 | 9/1974 | Dal et al. | 137/392 X |
| 3,930,258 | 12/1975 | Dick et al. | 346/75 |
| 4,121,222 | 10/1978 | Diebold et al. | 346/75 |
| 4,130,126 | 12/1978 | Chocholaty et al. | 346/75 X |

*Primary Examiner*—Joseph W. Hartary
*Assistant Examiner*—W. J. Brady
*Attorney, Agent, or Firm*—Burgess, Ryan and Wayne

[57] ABSTRACT

In an ink-jet printer or the like, in order to maintain a predetermined concentration of ink, a diluent equal in quantity to the solvent of ink, which has been evaporated, is supplemented to the ink recirculation system.

3 Claims, 7 Drawing Figures

METHOD AND DEVICE FOR CONTROLLING CONCENTRATION OF INK FOR INK-JET PRINTER

BACKGROUND OF THE INVENTION

The present invention relates to a method and device for controlling the concentration of ink in an ink-jet printer or the like.

There have been proposed various methods and devices for controlling the concentration of ink in ink-jet printers or the like. For instance, a diluent is added to the ink recirculation system when the concentration measured in terms of a number of ink drops dropping from a tube per unit time interval or a resistance of ink shows that the ink concentration is higher than a predetermined value. However, the above-described ink concentration measurements are adversely affected by the ambient temperature.

According to another prior art method, the concentration or viscosity is measured by detecting the flow rate of ink emitted from a dummy nozzle, but this method is also adversely affected by the ambient temperature.

SUMMARY OF THE INVENTION

In view of the above, the primary object of the present invention is to provide for ink-jet printers or the like a method and device for maintaining a uniform ink concentration without being affected by the ambient temperature.

Briefly stated, according to the present invention, a diluent or a solvent is added to the ink recovered, whereby the concentration of ink can be maintained uniform.

BRIEF DESCRIPTION OF THE DRAWINGS

Same reference numerals are used to designate similar parts throughout the figures.

DETAILED DESCRIPTION OF THE PRIOR ART

Figure 1:
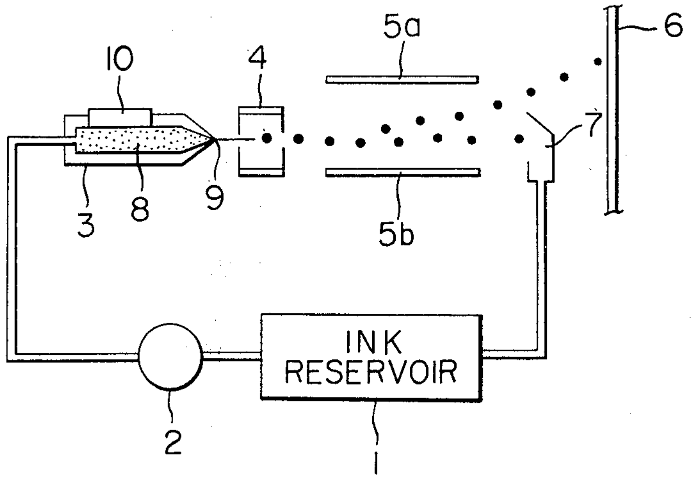
FIG. 1 PRIOR ART
FIG. 1 is a diagrammatic view used for the explanation of a conventional electrostatic type ink-jet printer.

FIG. 1 shows a conventional ink-jet printer of the type comprising an ink reservoir 1, a pump 2, an ink drop generator 3, a charge electrode 4, a pair of deflection plates 5*a* and 5*b*, a recording sheet 6, a gutter 7, an ink manifold 8, a nozzle 9 and a piezoelectric crystal 10.

The ink in the reservoir 1 is supplied by the pump 2 to the ink manifold 8 from which is emitted a continuous jet of ink through the nozzle 9. By a high-frequency pressure variation applied by the piezoelectric crystal 10, the ink-jet breaks up into a stream of ink drops. When an ink drop breaks off, it is selectively charged by the charge electrode 4. The charged drop is deflected by the deflection plate pairs 5*a* and 5*b* so as to be steered to a predetermined position on the recording sheet 6 and printed as an ink dot. An uncharged drop travels straight and is trapped by the gutter 7 so as to be recirculated into the reservoir 1.

An ink drop traps a charge proportional to the voltage on the charge electrode 4 when the drop is selected to be printed and is deflected by the deflection plates 5*a* and 5*b* by an angle proportional to the charge trapped on the drop as described previously. However, the charge on a drop and the deflection angle of the charged drop vary depending upon the mass and emission velocity of the drop. As a result, the charged ink drop is not steered along a predetermined trajectory, so that the misplacement of ink drops result and consequently a printed image is distorted. It follows therefore that in a high-resolution ink-jet printer; that is, a printer which must steer the charged ink drops correctly to predetermined position, the pressure, temperature and viscosity of the ink which cause the variations in mass and emission velocity of each ink drop must be maintained uniform. Of these three factors, the control on viscosity is difficult because not only the viscosity of ink is greatly dependent upon the temperature but also the solvent of ink is evaporated while ink drops are travelling and the uncharged ink drops are trapped by and collected in the gutter 7, so that when trapped ink drops are directly returned to the reservoir 1, the increase in viscosity of ink inevitably results.

The above-described variation in viscosity of ink also occurs in an ink-jet printer of the type in which uncharged ink drops are placed on a recording sheet while the charged ink drops are trapped and recirculated. As a result, the variation in viscosity causes the variations in mass and emission velocity which in turn cause the misdeflection, thereby causing the misplacement of ink drops.

Figure 2A:
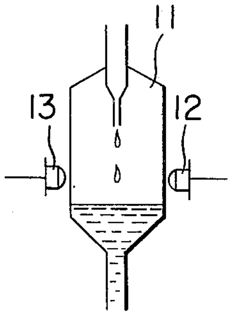
FIG. 2A PRIOR ART
FIGS. 2A and 2B are views used for the explanation of the prior art methods for measuring the viscosity of ink.
Figure 2B:
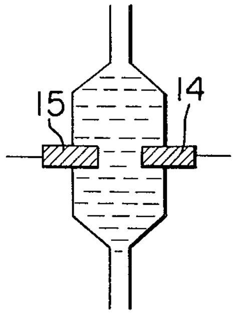
FIG. 2B PRIOR ART

In order to overcome the above and other problems caused by the variation in viscosity of ink, there have been proposed various methods. For instance, the method disclosed in Japanese laid open patent application No. 74939/1975 will be described below with reference to FIG. 2. As shown in FIG. 2A, the ink drops by gravity into a transparent container 11 and the ink drop frequency; that is, the number of ink drops dropped into the container 11 per unit time interval is measured by a light-emitting element 12 and a light sensor 13 disposed in opposed relationship with each other across the container 11. The viscosity of ink is, therefore, measured in terms of the ink drop frequency. Alternatively, as shown in FIG. 2B, the viscosity of ink filled in the container can be measured in terms of the electrical resistance by a pair of electrodes 14 and 15 which are spaced apart from each other by a suitable distance. In response to the ink viscosity thus detected, fresh ink is supplemented in a required quantity to an ink recirculation system so that a predetermined degree of viscosity can be maintained.

However, the method shown in FIG. 2A is adversely affected by the ambient temperature. More specifically, the variation in ambient temperature causes the variation in viscosity of ink in a tube from which the ink drops fall into the container 11. As a result, the ink drop frequency varies. In addition, when ink drops adhere to the inner wall of the container 11, the optical detection becomes impossible. The method shown in FIG. 2B has also a problem that the measurement accuracies are reduced due to the deposition of the solution and additives in ink on the electrodes 14 and 15.

Another example of ink viscosity control devices is disclosed in Japanese Laid Open patent application No. 21723/1979. This device includes a means for sensing the viscosity of ink supplied and a control means responsive to the output signal from the sensing means for controlling the valves of a diluent reservoir and an ink reservoir, thereby maintaining a predetermined viscosity. The viscosity of ink is detected by detecting whether the quantity of ink emitted through a dummy nozzle is above or below a predetermined value. This viscosity measurement is also affected in accuracy by the ambient temperature, so that unless a means for maintaining the temperature of the dummy nozzle and its associated part at a predetermined level, the correct viscosity measurements are impossible.

The present invention was made to overcome the above and other problems encountered in the prior art ink viscosity control methods and devices. According to one embodiment of the present invention, fresh ink in the same quantity as the ink drops placed on the recording sheet is supplied to an ink reservoir and a diluent in the same quantity as the solvent evaporated from the collected ink drops is supplemented to the ink reservoir, whereby the viscosity of ink can be maintained at a predetermined level and subsequently high quality ink-dot images can be obtained.

According to another embodiment of the present invention, the quantity A of ink emitted from an ink drop generator as well as the quantity B of ink drops placed on a recording sheet are measured and a diluent in the same quantity as the difference between A and B is added to the collected ink, whereby the viscosity of printing ink can be maintained at a predetermined level and subsequently high-quality ink dot images can be obtained.

DESCRIPTION OF THE PREFERRED EMBODIMENTS

Figure 3:
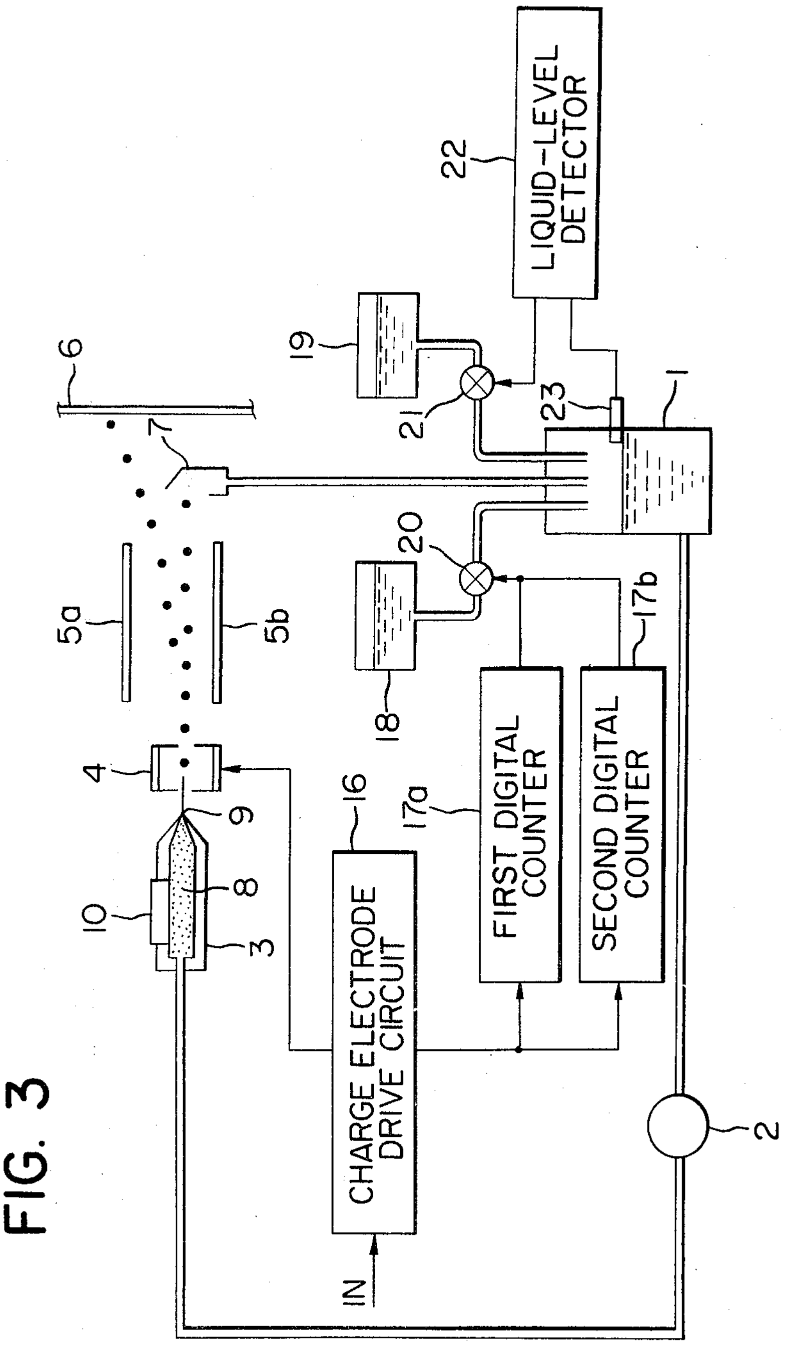
FIGS. 3, 4 and 5 show first, second and third embodiments, respectively, of the present invention.

First Embodiment, FIG. 3

Referring to FIG. 3, an ink-jet printer of the type described with reference to FIG. 1 includes an ink-jet printing ink viscosity control device comprising a charge electrode drive circuit 16 for applying to the charge electrode 4 a voltage in response to a print signal; first and second digital counters 17*a* and 17*b* each for counting the number of times when the drive circuit 16 is activated or energized; that is, the number of ink drops charged by the charge electrode 4; an ink reservoir 18, a diluent reservoir 19, valves 20 and 21, a liquid-level detector 22 and a liquid-level probe 23.

The mode of operation is as follows. The mass $m_j$ of each ink drop emitted from the ink drop generator 3 is a function of the capacity of the pump 2, the diameter of the nozzle 9 and the synchronizing frequency of the piezoelectric crystal 10. In general, the mass $m_j$ is given by $$m_j = v_o / f_o$$

whereby

- $v_o$ is the quantity of ink supplied to the ink manifold 8 per unit time interval, and
- $f_o$ is the synchronizing frequency of the crystal 10.

It follows, therefore, that the quantity per unit time interval of ink drops placed on the recording sheet 6 is the product of the mass $m_j$ and the number of ink drops charged during the same time interval.

The charging times; that is, the number of ink drops charged, are counted by the first digital counter 17*a* up to $2^N$ and then the second digital counter 17*b* takes over to count continuously beyond $2^N$. The counting up to $2^N$ by the first counter 17*a* means that the quantity of $2^N \times m_j$ of ink has been consumed for placing the ink dots on the recording sheet 6. Then the fresh ink in the quantity equal to $2^N \times m_j$ is supplied to the ink reservoir 1 by opening the valve 20 of the fresh ink reservoir 18. Each uncharged ink drop loses some mass while it travels from the ink drop generator 3 to the gutter 7 and then is returned to the ink reservoir 1 because the solvent is evaporated as described elsewhere. As a consequence, even when the fresh ink is supplied to the ink reservoir 1 in order to compensate for the consumed ink $2^N \times m_j$, the level of ink in the reservoir 1 is lower than a reference level at which the ink would reach unless the solvent of the uncharged and collected ink drops were not evaporated. Therefore, the diluent or the solvent is supplied in a quantity corresponding to the difference between the reference level and the present or actual level detected by opening the valve 21 of the diluent reservoir 19. More specifically, the liquid-level probe 23 is positioned at the reference or initial level which can be determined depending upon the results of experiments. When the actual level of ink is below the probe 23, the diluent is supplied until the liquid level reaches the probe 23. Then the liquid-level detector 22 generates the signal in response to which the valve 21 quickly shunts excess supply of the diluent to the ink recirculation system. When the second digital counter 17*b* has counted up to $2^N$, the fresh ink and the diluent are supplied again in the manner described above. The above-described compensation step is repeated every time when either of the counter 17*a* or 17*b* has counted up to $2^N$. As a result, the overall quantity of ink in the ink recirculation system can be maintained at an initial level and the viscosity of ink can be also maintained at a predetermined degree.

In the case of an ink-jet printer of the type in which the charged ink drops are recovered while the uncharged ink drops are placed on the recording sheet, the difference between the synchronizing frequency of the crystal 10 and the charging frequency or times is obtained so as to determine the timing of supplementing the fresh ink and the diluent in a manner substantially similar to that described above.

The liquid-level probe 23 is of the direct contact type, but it is to be understood that an indirect or noncontact type probe such as a pair of a light-emitting element and a light sensor can be employed.

Figure 4:
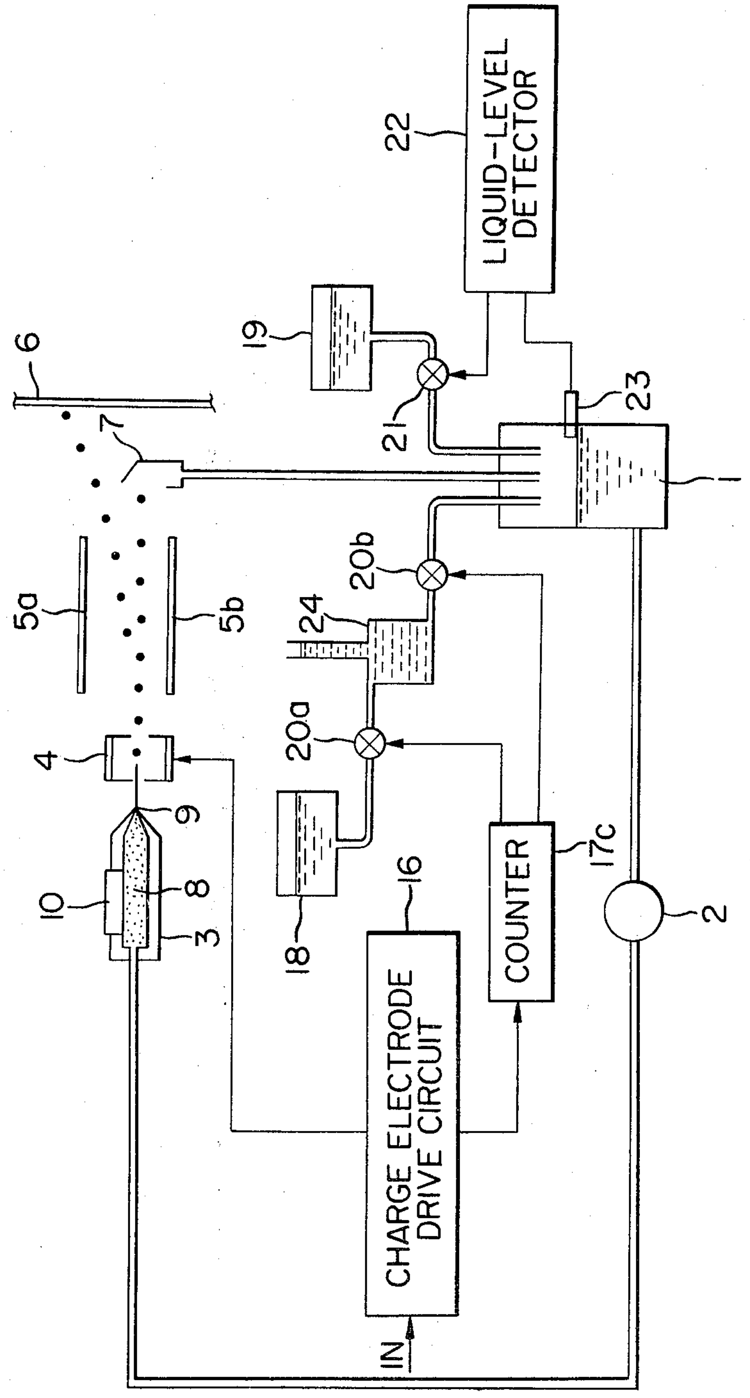

Second Embodiment, FIG. 4

A second embodiment shown in FIG. 4 is substantially similar in construction to the first embodiment described just above except (A) that an auxiliary fresh ink reservoir 24 with a valve 20*b* is interposed between the ink reservoir 1 and the fresh ink reservoir 18 or more precisely its valve 20*a* and (B) that only one digital counter 17*c* is used.

According to the second embodiment, the fresh ink in the quantity equal to one supply; that is, $2^N \times m_j$ is previously stored in the auxiliary fresh ink reservoir 24 and when the counter 17*c* has counted up to $2^N$, the valve 20*b* is opened so that the fresh ink in the auxiliary reservoir 24 flows into the ink reservoir 1. In this case, the valve 20*b* remains opened for a time interval longer than a time interval required for discharging all the fresh ink in the auxiliary reservoir 24 whose capacity is equal to one supply; that is, $2^N \times m_j$. Thereafter, the valve 20*a* is opened for a time interval longer than a time interval required for completely fill the auxiliary reservoir with the fresh ink supplied from the fresh ink reservoir 18 so that one supply; that is $2^N \times m_j$; is stored again in the reservoir 24. The fresh ink supplementing operation consisting of the above-described two sequential steps is repeated every time when the counter 17*c* has counted a predetermined number of evens $2^N$.

The diluent is supplemented in the manner described in conjunction with the first embodiment. Thus the quantity of ink in the ink recirculation system can be always maintained at a predetermined level and the viscosity of ink can be also maintained at a predetermined degree.

The second embodiment and the first embodiment as well is advantageous in that the measurements of ink viscosity which is much influenced by the ambient temperature can be eliminated. With the ink with a uniform viscosity, high-quality images can be obtained.

Figure 5:
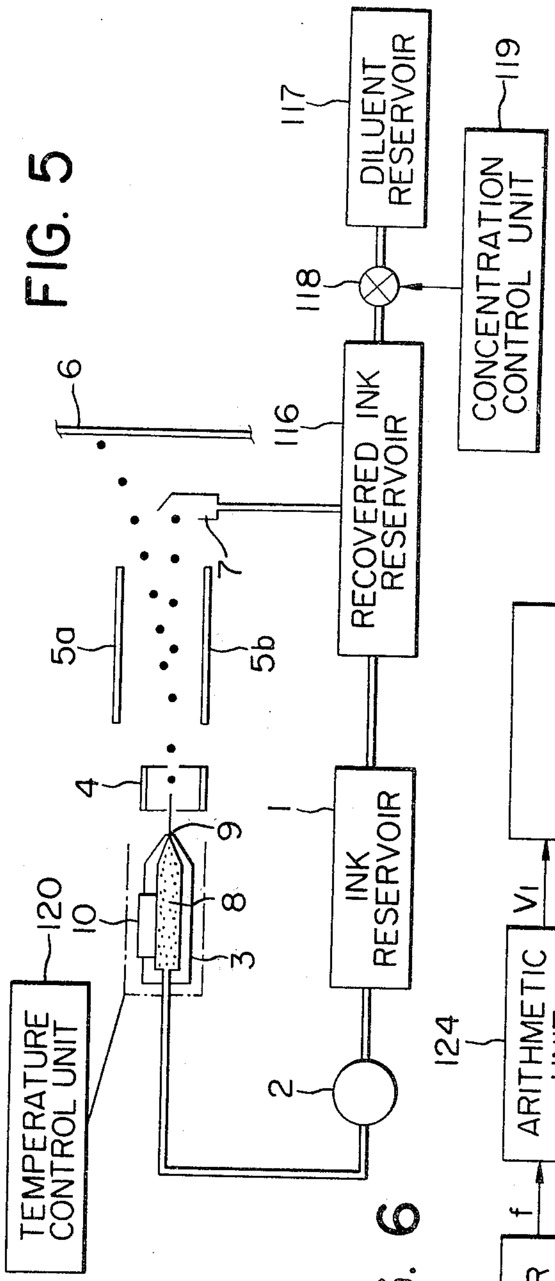

Third Embodiment, FIG. 5

A third embodiment shown in FIG. 5 comprises a recovered ink reservoir 116, a diluent reservoir 117, a solenoid-operated three-port valve 118, a concentration control unit 119 and a temperature control unit 120 for maintaining the ink in the ink manifold 8 at a predetermined temperature of, for example, 40° C. which is preferred because the temperature of the ink can be controlled only with a heater without the use of a refrigerator or the like and because the degradation of ink can be prevented.

Figure 6:
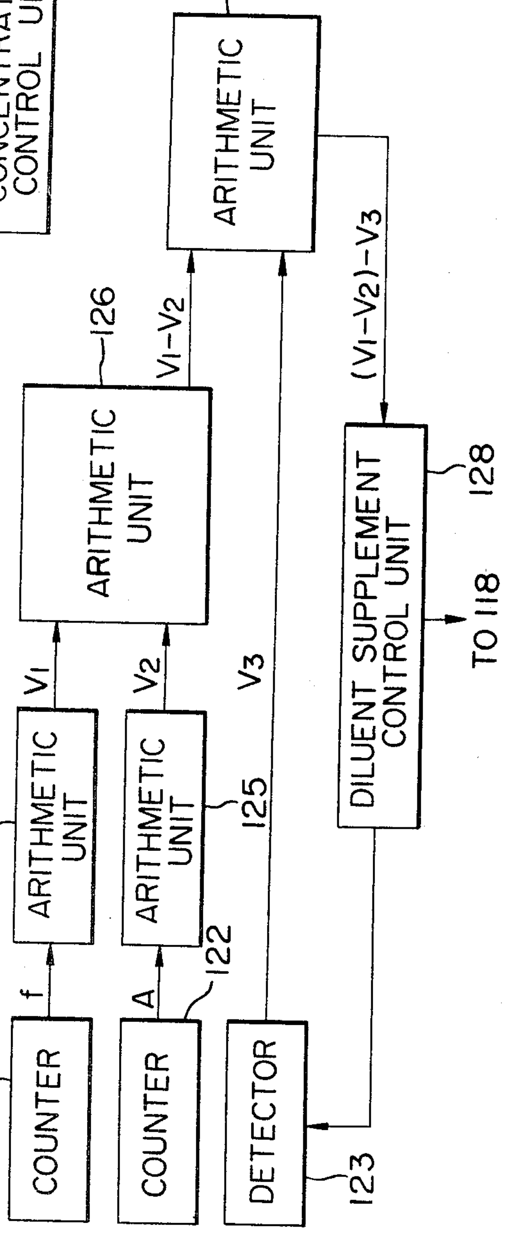
FIG. 6 is a block diagram of a concentration control unit shown in FIG. 5.

The concentration control unit 119 is shown in detail in FIG. 6. The unit comprises a counter 121 for counting the frequency of the piezoelectric crystal 10, a counter 122 for counting the data inputs or pulses to the charge electrode 4, a detector 123 for detecting the quantity of recovered ink, arithmetic units 124, 125, 126 and 127 and a diluent supplement control unit 128.

The results of experiments conducted by the inventor show the fact that when the temperature of ink is maintained constant, the variations in viscosity of ink are caused by the evaporation of a solvent of ink drops in flight and trapped in the gutter 7. Therefore, it follows that the initial viscosity can be recovered by adding a diluent in quantity equal to that of the evaporated or lost solvent. The quantity of evaporated solvent is expressed by $$(V_1 - V_2) - V_3$$

where $V_1$ is the quantity of ink emitted from the ink drop generator 3, $V_2$ is the quantity of ink drops charged by the charge electrode 4, and $V_3$ is the quantity of ink recovered in the reservoir 116.

The quantity $V_1$ of emitted ink is obtained by multiplying the average mass of ink drops emitted from the ink drop generator 3 by the synchronizing frequency of the crystal 10, and as described elsewhere the mass of each ink drop is dependent upon the design factors such as the capacity of the pump 2, the diameter of the nozzle 9, the synchronizing frequency of the piezoelectric crystal 10 and so on. The quantity $V_4$ of each drop is given by $$V_4 = V_o / f_o$$

where $V_o$ is the quantity of ink supplied to the ink drop generator 3 per unit time interval, and $f_o$ is the synchronizing frequency of the crystal 10.

The number of vibrations $f$ per unit time interval of the crystal 10 is counted by the first counter 121 and, therefore, the quantity $V_1 = (V_o \times f)/f_o$ can be obtained by the first arithmetic unit 124.

The quantity $V_2$ of ink drops placed on the recording sheet 6 can be obtained by the second arithmetic unit 125 by multiplying $V_o/f_o$ by A, where A is the number of data inputs applied per unit time interval. The difference $(V_1 - V_2)$ which is obtained by the third arithmetic unit 126 is the quantity of ink drops to be recovered if the solvent were not evaporated. The output of the third arithmetic unit 126 representative of the difference $(V_1 - V_2)$ and the output signal of the recovered ink detector 123 representing the quantity $V_3$ of actually recovered ink are applied to the fourth arithmetic unit 127 so that the quantity $V_{LOST}$ of the solvent which is equal to $[(V_1 - V_2) - V_3]$ is obtained. In response to the output signal from the fourth arithmetic unit 127 representative of the quantity $V_{LOST}$ of lost solvent, the diluent supplement control unit 128 controls the valve 118 (See FIG. 5) in such a way that a suitable quantity of diluent may be added to the ink recirculation system; that is, $[(V_1 - V_2) - V_3]$ becomes zero.

For instance, assume that a multiple-nozzle print head has 60 nozzles each of which emits the ink at the rate of 1 cc/min. Then, the print head emits the ink at the rate of 60 cc/min, but in general only about 0.5% of the emitted ink drops reach the sheet 6, so that 99.5% of the drops are recovered. The quantity $V_3$ of ink recovered in the reservoir 116 per unit time interval or after a predetermined number of emission of ink drops can be measured by the use of a suitable liquid-level detector or in terms of a weight by a suitable weighing device. The recovered ink detector 123 may be located within the gutter 7. The diluent may be added to the ink collected in the gutter 7 so that the diluted ink may be recovered in the reservoir 116.

So far the third embodiment has been described in conjunction with the ink-jet printer of the type in which the charged ink drops are placed on the recording sheet 6 while the uncharged drops are collected. In the case of an ink-jet printer of the type in which the uncharged ink drops are placed on the recording sheet 6 while the charged drops are recovered, the quantity $V_2$ of ink drops placed on the recording paper 6 can be obtained by $$V_o/f_o \times (f - A)$$

where $V_o/f_o$ is the quantity of each ink drop, and $(f - A)$ is the number of uncharged ink drops.

In summary, according to the third embodiment of the present invention, the quantity of ink drops emitted from the ink drop generator 3 and the quantity of ink drops placed on the recording sheet 6 are measured so that the quantity of ink to be recovered if the solvent were not evaporated is calculated. Subtracted from this quantity is the quantity of ink which has been actually recovered, so that the quantity of the evaporated or lost solvent is calculated. Thereafter, a diluent equal in quantity to the evaporated or lost solvent is added to the ink recirculation system, whereby the concentration of ink can be uniformly maintained. As a result, the viscosity of ink to be emitted from the ink drop generator can be maintained at a desired degree without being influenced by the ambient temperature so that high-quality printing can be ensured.

What is claimed is:

1. A method for controlling the concentration of ink in an ink-jet printer of the type in which the ink is supplied from an ink reservoir to an ink drop generator which in turn emits a continuous jet of ink which in turn breaks up into a stream of ink drops by the synchronizing signal applied by a piezoelectric crystal to the ink drop generator and the ink drops are selectively charged by a charge electrode so that the charged or uncharged ink drops are placed on a recording sheet and the uncharged or charged ink drops are collected and recovered into said ink reservoir, characterized by measuring the quantity of ink emitted from the ink drop generator based on the number of vibrations per unit time interval of said piezoelectric crystal, measuring the quantity of ink used in printing based on the number of times per said unit time interval the charge electrode has or has not charged the ink drops, measuring the quantity of ink actually recovered in a recovered ink reservoir, and supplementing a diluent into said recovered ink reservoir equal in quantity to the difference obtained by subtracting from the difference between the quantity of emitted ink and the quantity of used ink the quantity of actually recovered ink.

2. A device for controlling the concentration of ink in an ink-jet printer of the type in which the ink is supplied from an ink reservoir to an ink drop generator which in turn emits a continuous jet of ink which in turn breaks up into a stream of ink drops by the synchronizing signal applied by a piezoelectric crystal to the ink drop generator and the ink drops are selectively charged by a charge electrode so that the charged or uncharged ink drops are placed on a recording sheet and the uncharged or charged ink drops are collected and recovered into said ink reservoir, comprising a first detecting means for detecting the quantity of ink emitted from the ink drop generator based upon the number of vibrations per unit time interval of the piezoelectric crystal, a second detecting means for detecting the quantity of ink used in printing based upon the number of times said charge electrode has or has not charged the ink drops, a third detecting means for measuring the quantity of ink to be recovered if no solvent were evaporated, a fourth detecting means for detecting the quantity of actually recovered ink, a diluent supplementing means for supplementing said recovered ink with a diluent in quantity equal to the difference obtained by subtracting the quantity of said actually recovered ink from the difference between the quantity of emitted ink and the quantity of used ink.

3. A device for controlling the concentration of ink as set forth in claim 2 in which said first detecting means comprises a first counter for counting the number of vibrations of said piezoelectric crystal per unit time interval and a first arithmetic unit, said second detecting means comprises a second counter for counting the number of pulses applied to said charge electrode per said unit time interval and a second arithmetic unit, said third detecting means comprises a third arithmetic unit for subtracting the output from said second arithmetic unit from the output from said first arithmetic unit, said fourth detecting means comprises a circuit for detecting the quantity of ink actually recovered and a fourth arithmetic unit for obtaining the difference between the output from said third arithmetic unit and the output from said circuit for detecting the quantity of ink actually recovered.

* * * * *